US008418801B2

United States Patent
Izutani

(10) Patent No.: US 8,418,801 B2
(45) Date of Patent: Apr. 16, 2013

(54) ELECTRIC POWER STEERING SYSTEM

(75) Inventor: Keisuke Izutani, Yamatotakada (JP)

(73) Assignee: JTEKT Corporation, Osaka-shi (JP)

( * ) Notice: Subject to any disclaimer, the term of this patent is extended or adjusted under 35 U.S.C. 154(b) by 0 days.

(21) Appl. No.: 13/367,694

(22) Filed: Feb. 7, 2012

(65) Prior Publication Data

US 2012/0205187 A1  Aug. 16, 2012

(30) Foreign Application Priority Data

Feb. 16, 2011 (JP) ................. 2011-030904

(51) Int. Cl.
  *B62D 6/00* (2006.01)
  *B62D 5/04* (2006.01)
(52) U.S. Cl.
  USPC .......................................................... 180/446
(58) Field of Classification Search ............. 180/446
  See application file for complete search history.

(56) References Cited

U.S. PATENT DOCUMENTS

| 4,756,375 | A | * | 7/1988 | Ishikura et al. | 180/446 |
| 5,000,278 | A | * | 3/1991 | Morishita | 180/446 |
| 6,223,852 | B1 | * | 5/2001 | Mukai et al. | 180/446 |
| 2005/0257993 | A1 | * | 11/2005 | Inui et al. | 180/446 |
| 2013/0001006 | A1 | * | 1/2013 | Gibson et al. | 180/446 |

FOREIGN PATENT DOCUMENTS

| JP | A-2005-271640 | 10/2005 |
| JP | A-2010-115954 | 5/2010 |
| JP | A-2010-173417 | 8/2010 |

* cited by examiner

*Primary Examiner* — Tony Winner
(74) *Attorney, Agent, or Firm* — Oliff & Berridge, PLC

(57) ABSTRACT

An inverter energy consumption calculating portion estimates the actual power consumption of a steering operation assist motor after an engine is placed in an idle-stop state, and a command value of current to be supplied to the steering operation assist motor is limited such that the command value is smaller as the energy consumption is larger. The inverter energy consumption calculating portion calculates the energy consumption of an inverter drive circuit by integrating an amount of electric power consumed by the drive circuit.

12 Claims, 4 Drawing Sheets

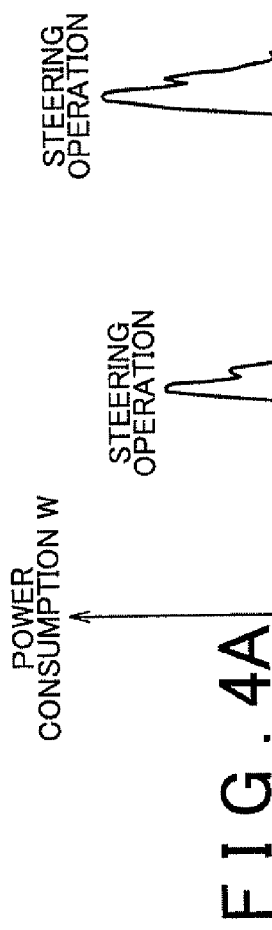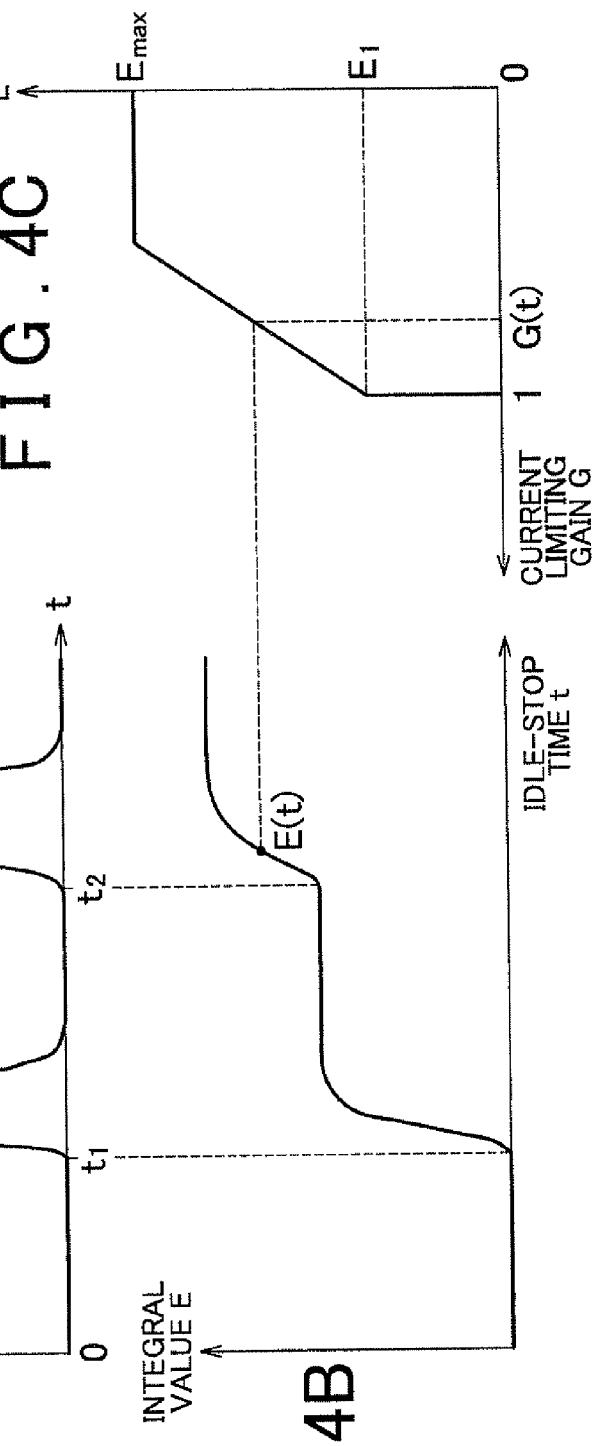

ELECTRIC POWER STEERING SYSTEM

INCORPORATION BY REFERENCE

The disclosure of Japanese Patent Application No. 2011-030904 filed on Feb. 16, 2011 including the specification, drawings and abstract, is incorporated herein by reference in its entirety.

BACKGROUND OF THE INVENTION

1. Field of the Invention

The invention relates to an electric power steering system including a steering operation assist motor.

2. Description of Related Art

The torque of a steering operation assist motor (will hereinafter be simply referred to as "electric motor") used in an electric power steering system is controlled by supplying currents to stator coils of the electric motor according to the vehicle speed and the steering operation torque. The electric motor is powered by a power source, such as a storage battery. However, because the power source has its powering limit, the power supplied to the electric motor is limited based on the powering limit of the power source. More specifically, the current supplied from the power source is limited at or below a certain level according to the powering limit of the power source.

Japanese Patent Application Publication No. 2005-271640 describes a method that is used in a vehicle that has an idle-stop function. According to this method, in order to reduce the load on a power source when a steering wheel is manually operated while an engine is in an idle-stop state, the drive force of an electric motor is limited to be equal to or smaller than a predetermined level when the engine is in the idle-stop state. This makes it easier to restart the engine. Further, Japanese Patent Application Publication No. 2010-173417 describes a method in which an upper limit value of current to be supplied to an electric motor is reduced as time passes from when the amount by which the steering wheel has been manually operated during an idle-stop state of the engine (i.e., the steering operation torque or the steering operation speed) exceeds a set steering operation amount.

According to the method described in Japanese Patent Application Publication No. 2005-271640, the rotation speed of the electric motor is gradually reduced from when the engine is automatically stopped. Therefore, for example, if the steering wheel is operated when a certain amount of time has elapsed since an automatic stop of the engine, a driver may have a feeling of strangeness that the steering wheel has suddenly become heavy to turn, which is undesirable. According to the method described in Japanese Patent Application Publication No. 2010-173417, once a state where the steering operation torque is larger than a set level is detected, the steering operation assist is limited as time passes from the detection. Therefore, for example, when the driver operates the steering wheel again some time after operating the steering wheel and then taking his or her hands off the steering wheel, because the electric motor current is largely limited at this time, the driver may have, as in the case of the foregoing method, a feeling of strangeness that the steering wheel has suddenly become heavy to turn, which is also undesirable.

SUMMARY OF THE INVENTION

It is an object of the invention to provide an electric power steering system that is capable of setting an optimum steering operation assist amount based on a relation between the amount of power actually consumed by a steering operation assist motor after an engine is placed in an idle-stop state and the load on a power source of a vehicle.

An aspect of the invention relates to an electric power steering system including: a unit that detects an idle-stop state of an engine; a steering operation assist motor that produces steering operation assist force; a drive circuit that drives the steering operation assist motor; a power source that powers the drive circuit; an energy consumption calculating unit that calculates or estimates an amount of energy that is consumed by the drive circuit from when the engine is placed in the idle-stop state; a current limiting unit that limits a command value of current to be supplied to the steering operation assist motor such that the current command value is smaller as the amount of energy consumed by the drive circuit is larger, the amount of energy consumed by the drive circuit being calculated or estimated by the energy consumption calculating unit; and a motor drive controlling unit that controls the drive circuit based on the current command value limited by the current limiting unit.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 4A is a graph illustrating how an EPS power consumption changes in time after an engine is placed in an idle-stop state;

FIG. 4B is a graph illustrating how an EPS energy consumption, which is obtained by integrating the EPS power consumption, changes in time;

FIG. 4C is a graph illustrating a relation between the EPS energy consumption and a current limiting gain, as in FIG. 3.

DETAILED DESCRIPTION OF EMBODIMENTS

Figure 1:
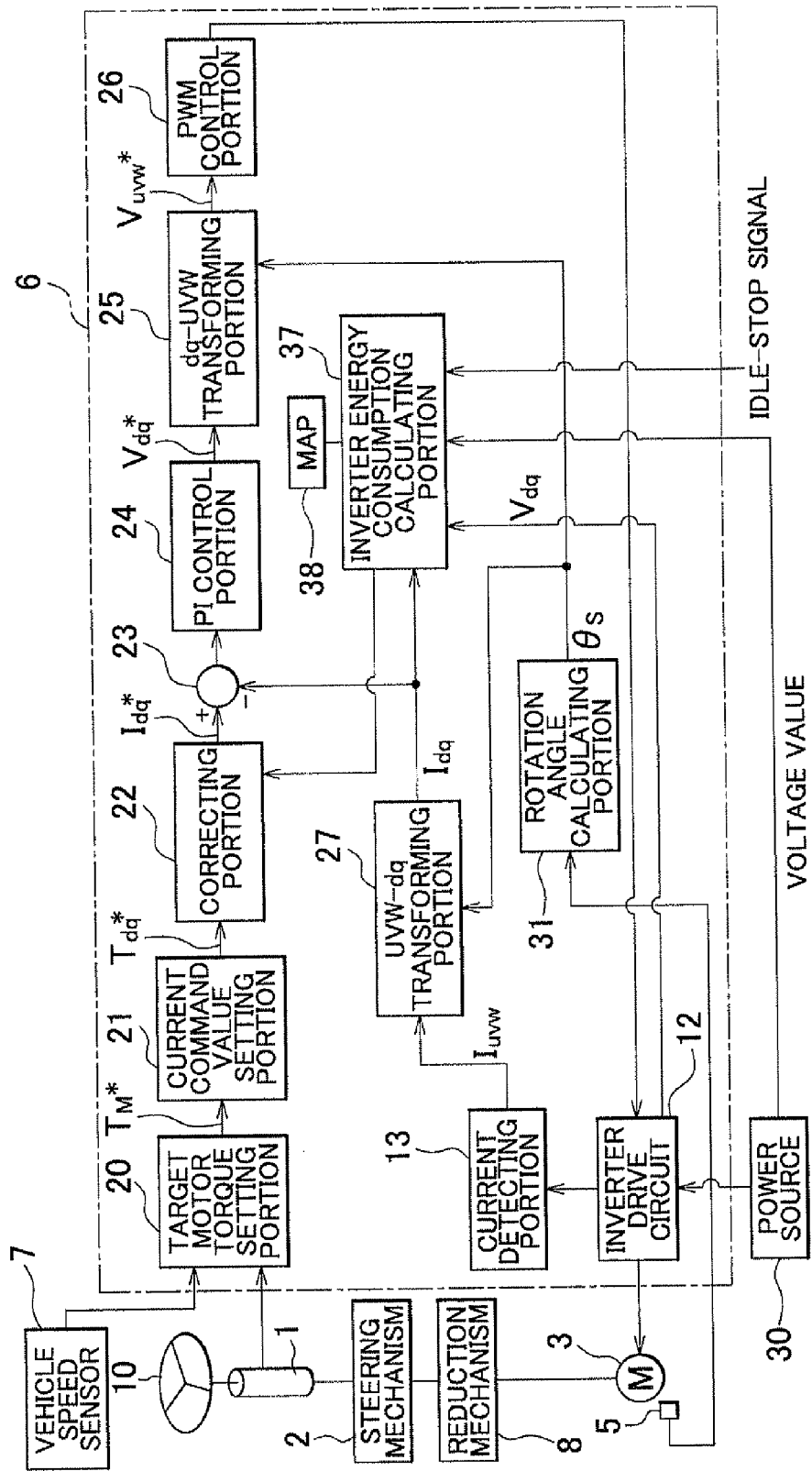
FIG. 1 is a block diagram illustrating the electric configuration and control functions of an electric power steering system according to an example embodiment of the invention.

Hereinafter, example embodiments of the invention will be described in detail with reference to the accompanying drawings. FIG. 1 is a block diagram illustrating the electric configuration and control functions of an electric power steering system of according to an example embodiment of the invention. The electric power steering system includes a torque sensor 1, an electric motor 3 (an example of "steering operation assist motor"), a power source 30 (e.g., a storage battery), a rotation angle sensor 5 (e.g., a resolver), a vehicle speed sensor 7, and an electric motor control unit 6. The torque sensor 1 detects steering operation torque T that is applied to a steering wheel 10 that is an operation member manually operated to steer the vehicle. The electric motor 3 applies steering operation assist force to a steering mechanism 2 of the vehicle via a reduction mechanism 8. The power source 30 powers the electric motor 3. The rotation angle sensor 5 detects the rotation angle (electric angle) of the electric motor 3. The vehicle speed sensor 7 detects the speed of the vehicle that includes the electric power steering system. The electric motor control unit 6 controls the driving of the electric motor 3.

The rotation angle sensor 5, the torque sensor 1, and the vehicle speed sensor 7 are connected to the electric motor control unit 6. The torque sensor 1 is provided at an intermediate portion of the steering shaft. The steering shaft includes an input shaft (not shown in the drawings) connected to the steering wheel 10 and an output shaft (not shown in the drawings) connected to an intermediate shaft (not shown in the drawings). The input shaft and the output shaft are connected to each other via a torsion bar (not shown in the drawings) so as to be rotatable on the same axis. As the steering wheel 10 is turned, the torsion bar is twisted, causing a relative rotation of a minute angle between the input shaft and the output shaft. The displacement due to the relative rotation is detected by the torque sensor 1. Thus, the torque sensor 1 detects steering operation torque Th corresponding to the rotation of the steering wheel 10. The vehicle speed sensor 7 detects the speed of the vehicle by detecting the rotation speed of a rotor of a vehicle wheel.

Figure 2:
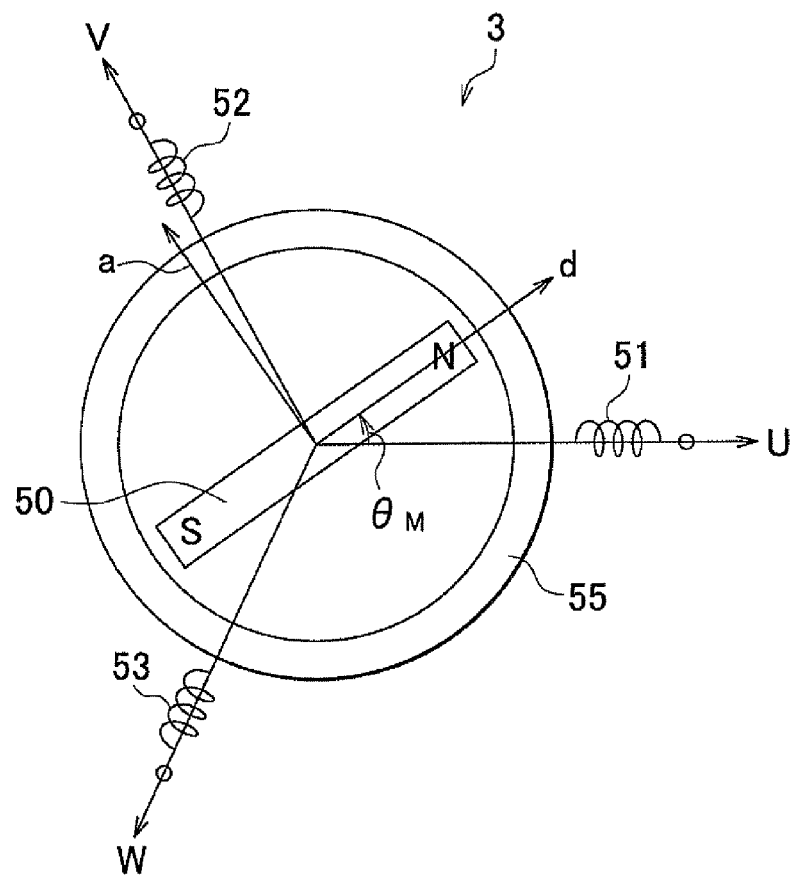
FIG. 2 is a view schematically illustrating the structure of an electric motor in the example embodiment.

The electric motor control unit 6 drives the electric motor 3 via an inverter drive circuit 12 in accordance with the steering operation torque detected by the torque sensor 1 and the vehicle speed detected by the vehicle speed sensor 7, so that the steering operation is properly assisted in an appropriate manner according to the steering operation state and the vehicle speed. In this example embodiment, the electric motor 3 is a three-phase electric motor, and includes, as schematically shown in FIG. 2, a rotor 50 that is a field magnet component, and a stator 55 which is opposed to the rotor 50 and on which a U-phase stator coil 51, a V-phase stator coil 52, and a W-phase stator coil 53 are provided. It is to be noted that the electric motor 3 may either be of an inner-rotor type in which a stator is provided around a rotor such that the rotor and the stator are opposed to each other or of an outer-rotor type in which a stator is disposed in a cylindrical rotor such that the rotor and the stator are opposed to each other.

As shown in FIG. 2, a three-phase fixed coordinate system (UVW coordinate system) is defined with a U-axis, a V-axis, and a W-axis extending in the directions of the respective stator coils 51, 52, and 53. Further, a two-phase rotating coordinate system (d-q coordinate system) is defined with a d-axis (magnetic pole axis) extending along the magnetic pole direction of the rotor 50 and a q-axis (torque axis) extending in a direction perpendicular to the d-axis in the rotary surface of the rotor 50. The d-q coordinate system is a rotating coordinate system that rotates as the rotor 50 rotates. Because only the q-axis current contributes to the torque production by the rotor 50 in the d-q coordinate system, the d-axis current is regarded as being zero or negative, and the q-axis current is controlled in accordance with a desired torque level. A rotation angle θM of the rotor 50 is the rotation angle of the d-axis relative to the U-axis. The d-q coordinate system is an actual rotating coordinate system corresponding to the rotor angle θM. Using the rotor angle θM makes it possible to perform coordinate transformation between the UVW coordinate system and the d-q coordinate system.

Referring back to FIG. 1, the electric motor control unit 6 includes a current detecting portion 13 and the inverter drive circuit 12 that has a plurality of switching elements and drives the electric motor 3 through switching of the switching elements. The current detecting portion 13 includes current detectors for detecting the currents flowing through the respective stator coils 51, 52, and 53 of the electric motor 3 (refer to FIG. 2). More specifically, the current detecting portion 13 detects phase currents IU, IV, and IW of the three phase coils 51, 52, and 53 (i.e., the U-phase current IU flowing through the U-phase coil 51, the V-phase current IV flowing through the V-phase coil 52, and the W-phase current IW flowing through the W-phase coil 53).

The functional elements of the electric motor control unit 6 other than the current detecting portion 13 and the inverter drive circuit 12 are integrally provided as a microcomputer including a CPU (Central Processing Unit) and memories, such as a ROM (Read Only Memory) and a RAM (Random Access Memory), and adapted to execute various programs to serve as the multiple functional elements. The multiple functional elements include a target motor torque setting portion 20, a current command value setting portion 21, a correcting portion 22, a current difference calculating portion 23, a PI (Proportional Integral) control portion 24, a dq-UVW transforming portion 25, a PWM (Pulse Width Modulation) control portion 26, a UVW-dq transforming portion 27, a rotation angle calculating portion 31, and an inverter energy consumption calculating portion 37. Signals indicating that the engine is in an idle-stop state are sent to the inverter energy consumption calculating portion 37 from a CAN (Controller Area Network) bus line in the vehicle.

The rotation angle calculating portion 31 calculates the rotation angle (the electric angle) (will hereinafter be referred to as "the rotation angle θM") of the rotor 50 of the electric motor 3 based on the output signals of the rotation angle sensor 5. The rotation angle θM is output as a transform angle θs for coordinate transformation. The target motor torque setting portion 20 sets a target motor torque TM* based on the steering operation torque Th detected by the torque sensor 1 and the vehicle speed V detected by the vehicle speed sensor 7. More specifically, the target motor torque setting portion 20 sets the target motor torque TM* to a value corresponding to the detected vehicle speed and the detected steering operation torque, based on a relation of the target motor torque TM* with the steering operation torque, which is set in advance with respect to the vehicle speed.

The vehicle speed is substantially zero or near zero when the engine is in the idle-stop state. In such a case, therefore, the target motor torque TM* is set to a value corresponding to a vehicle speed of zero or a value corresponding to a vehicle speed near zero. For example, the detected steering torque is positive when the steering wheel 10 is turned counterclockwise, and is negative when the steering wheel 10 is turned clockwise. The target motor torque TM* is positive when the electric motor 3 is to produce steering operation assist force for turning the steering wheel 10 counterclockwise, and is negative when the electric motor 3 is to produce steering operation assist for turning the steering wheel 10 clockwise.

The target motor torque TM* set by the target motor torque setting portion 20 is sent to the current command value setting portion 21. The current command value setting portion 21 serves to set current command values representing the currents required to be supplied to the respective coordinate axes of the d-q coordinate system. Specifically, the current command value setting portion 21 sets a d-axis current command value Id* and a q-axis current command value Iq*. More specifically, the current command value setting portion 21 sets the q-axis current command value Iq* to a significant value and sets the d-axis current command value Id* to zero or a negative value. It is to be noted that the d-axis current command value Id* is set to a negative value when field-weakening control is executed.

The current command value setting portion 21 obtains the q-axis current command value Iq* by dividing the target motor torque TM*, which has been set by the target motor torque setting portion 20, by a torque constant KT of the electric motor 3. In this specification, the q-axis current command value Iq* thus set will hereinafter be referred to as "the motor current command value" where necessary. The q-axis current command value Iq* and d-axis current command value Id* set by the current command value setting portion 21 are sent to the current difference calculating portion 23 via the correcting portion 22.

Meanwhile, the current detecting portion 13 detects the U-phase current IU, the V-phase current IV, and the W-phase current IW for the electric motor 3 in the inverter drive circuit 12. It is to be noted that the U-phase current IU, the V-phase current IV, and the W-phase current IW will be collectively referred to as "the three-phase detection currents IUVW" where necessary. The three-phase detection currents IUVW detected by the current detecting portion 13 are sent to the UVW-dq transforming portion 27. The UVW-dq transforming portion 27 transforms, through coordinate transformation, the three-phase detection currents IUVW into a d-axis current Id and a q-axis current Iq in the two-phase rotating coordinate system (d-q coordinate system). It is to be noted that the d-axis current Id and the q-axis current Iq will be collectively referred to as "the two-phase detection currents Idq" where necessary. The transform angle θs obtained by the rotation angle calculating portion 31 is used in this coordinate transformation.

The inverter energy consumption calculating portion 37 determines a power consumption W of the inverter drive circuit 12 (unit: watt) (will hereinafter be referred to as "the EPS power consumption W") by applying the two-phase detection currents Idq, which have been obtained by the UVW-dq transforming portion 27, and voltages Vdq, which represents the voltages supplied to the inverter drive circuit 12 from the power source 30, to Equation 1 shown below. It is to be noted that the EPS power consumption W corresponds to the value of consumption of power in the power source 30.

$$W = VdId + VqIq \qquad \text{Equation 1}$$

The inverter energy consumption calculating portion 37 calculates an EPS energy consumption E (unit: joule) by integrating the EPS power consumption W from the time at which the engine is placed in the idle-stop state, as expressed by Equation 2 shown below. The duration of this integration is from the time at which the engine is placed in the idle-stop state to the present time.

$$E = \int W dt \qquad \text{Equation 2}$$

The inverter energy consumption calculating portion 37 calculates a current limiting gain G corresponding to the EPS energy consumption E and sends it to the correcting portion 22. Then, the correcting portion 22 limits the motor current command value Iq* by multiplying the motor current command value Iq* by the current limiting gain G.

Figure 3:
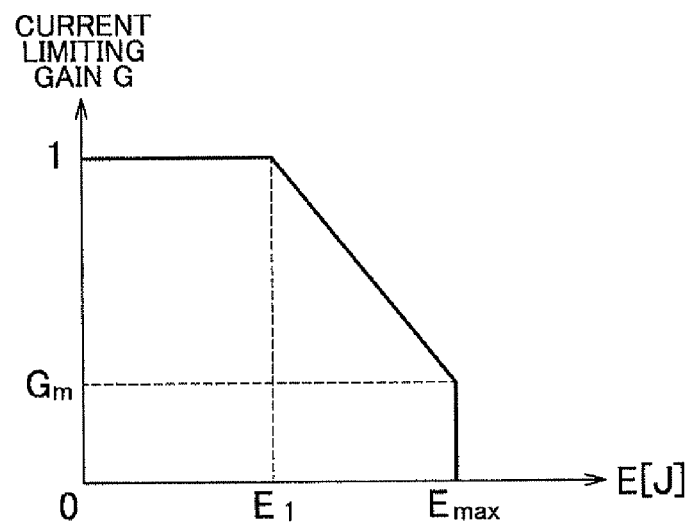
FIG. 3 is a graph illustrating a relation between an EPS energy consumption and a current limiting gain, which is used in the example embodiment.

The relation between the EPS energy consumption E and the current limiting gain G is prepared as a map and is stored in a memory 38 provided for the inverter energy consumption calculating portion 37. The graph in FIG. 3 illustrates an example of this map. The abscissa axis of the graph in FIG. 3 represents the EPS energy consumption E, while the ordinate axis represents the current limiting gain G. As is known from FIG. 3, the current limiting gain G starts decreasing from 1 when the EPS energy consumption E exceeds an intermediate point E1 (i.e., a point between zero and a maximum value Emax of the EPS energy consumption E), and then the current limiting gain G decreases to Gm when the EPS energy consumption E reaches the maximum value Emax. It is to be noted that Gm is a value between 0 and 1 ($0 \leq Gm \leq 1$), which corresponds to the maximum value Emax. The current limiting gain G linearly decreases down to Gm from 1 in the example illustrated in FIG. 3. However, the decrease in the current limiting gain G is not necessarily "linear". That is, for example, the current limiting gain G may be adapted to decrease in various other manners as long as the current limiting gain G decreases with an increase in the EPS energy consumption E. More specifically, various function forms (e.g., quadratic curves, exponential curves, and sine-wave curves) may be used.

The maximum value Emax of the EPS energy consumption E is set substantially equal to the powering limit of the power source 30. That is, the load on the power source 30 will be excessive if the EPS energy consumption E exceeds the powering limit of the power source 30. Therefore, it is necessary to limit the motor current command value Iq* using the current limiting gain G. The correcting portion 22 corrects the motor current command value Iq* using the current limiting gain G. If the corrected motor current command value Iq* is represented as "Iq*$_1$", it is expressed by Equation 3 below.

$$Iq^*_1 = Iq^* \times G \qquad \text{Equation 3}$$

The graph in FIG. 4A illustrates how the EPS power consumption W changes in time after the engine is placed in the idle-stop state. The graph in FIG. 4B illustrates how the EPS energy consumption E, which is obtained by integrating the EPS power consumption W, changes in time after the engine is placed in the idle-stop state. The graph in FIG. 4C illustrates the relation between the EPS energy consumption E and the current limiting gain G, as in the graph in FIG. 3. In a case where the engine is placed in the idle-stop state at time 0 and then the steering wheel 10 is manually operated for the first time at time t1 and then for the second time at time t2, the EPS power consumption W rises at time t1 and decreases for a while, and then rises again at time t2 and decreases for a while. The EPS energy consumption E, which is obtained by integrating the EPS power consumption W, is added up each time the EPS power consumption W occurs. The current limiting gain G(t) corresponding to the value of the EPS energy consumption E at a given time t is determined by mapping, as illustrated in the graph in FIG. 4C.

As shown in FIG. 4C, the current is not limited (i.e., the current limiting gain G is kept at "1") until the EPS energy consumption E exceeds the intermediate point E1. This is because the load on the power source 30 is small until the EPS energy consumption E exceeds the intermediate point E1. For this period of time, therefore, there is no or almost no possibility of insufficiency of assist torque, or the like, which may cause the driver to have a feeling of strangeness. When the EPS energy consumption E exceeds the intermediate point E1, the drive current for the electric motor 3 is reduced in accordance with the EPS energy consumption E, that is, it is limited to an appropriate level in advance. When the EPS energy consumption E exceeds the maximum value Emax, which is substantially equal to the powering limit of the power source 30, the drive current for the electric motor 3 is zeroed to stop the steering operation assist, in order to protect the power source 30.

Meanwhile, in a case where the electric motor 3 is an electric motor with a brush, the EPS power consumption W is calculated using Equation 1a shown below, in place of Equation 1.

$$W = V_m I_m \quad \text{Equation 1a}$$

In Equation 1a above, Vm represents the voltage supplied to the electric motor 3, and Im represents the current supplied to the electric motor 3. Further, the corrected motor current command value $Im^*_1$ is obtained using Equation 3a shown below, in place of Equation 3 above.

$$Im^*_1 = Im^* \times G \quad \text{Equation 3a}$$

Even when an electric motor with a brush is used as the electric motor 3, the power consumption is limited by adjusting the current supplied to the electric motor 3, as in the case where the electric motor 3 is a brushless electric motor.

The correcting portion 22 sends the obtained motor current command value $Iq^*_1$ to the current difference calculating portion 23. The current difference calculating portion 23 calculates the difference between the motor current command value $Iq^*_1$ and the two-phase detection current Iq, which is obtained from the UVW-dq transforming portion 27, and the difference between the d-axis current command value $Id^*_1$ and the two-phase detection current Id, which is also obtained from the UVW-dq transforming portion 27. The differences thus calculated are sent to the PI control portion 24. The PI control portion 24 sets two-phase command voltages Vdq* (a d-axis command voltage Vd* and a q-axis command voltage Vq*) to be supplied to the electric motor 3, by performing PT calculations on the current differences calculated by the current difference calculating portion 23. The two-phase command voltages Vdq* are sent to the dq-UVW transforming portion 25.

The dq-UVW transforming portion 25 transforms the two-phase command voltages Vdq* into three-phase command voltages VUVW*. This coordinate transformation is performed using the transform angle θs obtained by the rotation angle calculating portion 31. The three-phase command voltages VUVW* include a U-phase command voltage VU*, a V-phase command voltage VV*, and a W-phase command voltage VW*. The three-phase command voltages VUVW* are sent to the PWM control portion 26. The PWM control portion 26 sets a U-phase PWM control signal having a duty ratio corresponding to the U-phase command voltage VU*, a V-phase PWM control signal having a duty ratio corresponding to the V-phase command voltage VV*, and a W-phase PWM control signal having a duty ratio corresponding to the W-phase command voltage VW*, and sends them to the inverter drive circuit 12.

The inverter drive circuit 12 is constituted of a three-phase converter circuit including a U-phase converter circuit, a V-phase converter circuit, and a W-phase converter circuit. The switching elements of the inverter drive circuit 12 are controlled by the respective PWM control signals sent from the PWM control portion 26, whereby the stator coils 51, 52, and 53 of the electric motor 3 are energized, respectively, with the voltages corresponding to the three-phase command voltages VUVW*. With the electric power steering system thus structured, when steering operation torque is applied to the steering wheel 10 while the engine is in the idle-stop state, the torque sensor 1 detects the steering operation torque. Then, the target motor torque setting portion 20 sets the target motor torque TM* in accordance with the steering operation torque detected by the torque sensor 1 and the vehicle speed detected by the vehicle speed sensor 7 (note that the vehicle speed is zero in this state). Then, the current command value setting portion 21 sets the current command values Id* and Iq* corresponding to the target motor torque TM*.

The correcting portion 22 obtains the corrected motor current command value $Iq^*_1$ by applying the current limiting gain G to the motor current command value Iq* obtained from the current command value setting portion 21 and then outputs the corrected motor current command value $Iq^*_1$. Then, the current difference calculating portion 23 calculates the difference between the motor current command value $Iq^*_1$ and the two-phase detection current Iq and the difference between the motor current command value Id* and the two-phase detection current Id, and the PI control portion 24 performs PI calculations for bringing the differences to zero, and outputs the two-phase command voltages Vdq* corresponding to the results of the PI calculations. Then, the dq-UVW transforming portion 25 transforms the two-phase command voltages Vdq* into the three-phase command voltages VUVW*.

Subsequently, through the processing by the PWM control portion 26, the inverter drive circuit 12 operates according to the duty ratios corresponding to the three-phase command voltages VUVW* to drive the electric motor 3, whereby electric motor torque (assist torque) of a level corresponding to the final current command values Id* and $Iq^*_1$ is applied to the steering mechanism 2. In this way, it is possible to perform steering operation torque assist even when the engine is in the idle-stop state. Also, it is possible to set the optimum steering operation assist amount based on the relation between the amount of power actually consumed by the electric motor 3 after the engine is placed in the idle-stop state and the load on the power source of the vehicle.

When the engine is not in the idle-stop state, that is, when the engine is operating, the correcting portion 22 outputs the motor current command value Iq* obtained from the current command value setting portion 21 as it is without applying the current limiting gain G to the motor current command value Iq*. That is, the electric motor control unit 6 sets target current values based on the steering operation torque detected by the torque sensor 1 and the vehicle speed detected by the vehicle speed sensor 7, and then drives the electric motor 3 through the inverter drive circuit 12 such that the currents at the electric motor 3 are equal to the respective target current values. Thus, it is possible to achieve appropriate steering operation assist corresponding to the steering operation state and the vehicle speed.

Next, an electric power steering system according to other example embodiment of the invention will be described. In the foregoing example embodiment, the maximum value Emax of the EPS energy consumption E is substantially equal to the powering limit of the power source 30 and is constant. However, if the power source 30 is a storage battery, the power storage capacity of the storage battery decreases due to aging, etc. Thus, the maximum value Emax of the EPS energy consumption E may be set according to the power storage capacity of the storage battery. More specifically, the maximum value Emax may be made smaller when the power storage capacity of the storage battery is smaller, and made larger when the power storage capacity of the storage battery is larger. A change in the power storage capacity of the storage battery due to its degradation may be estimated by measuring the voltage of the storage battery when the level of load on the storage battery is zero or is constant and then examining the voltage. The line extending from the power source 30 to the inverter energy consumption calculating portion 37 in FIG. 1 represents the path of voltage measurement of the storage battery.

Figure 5:
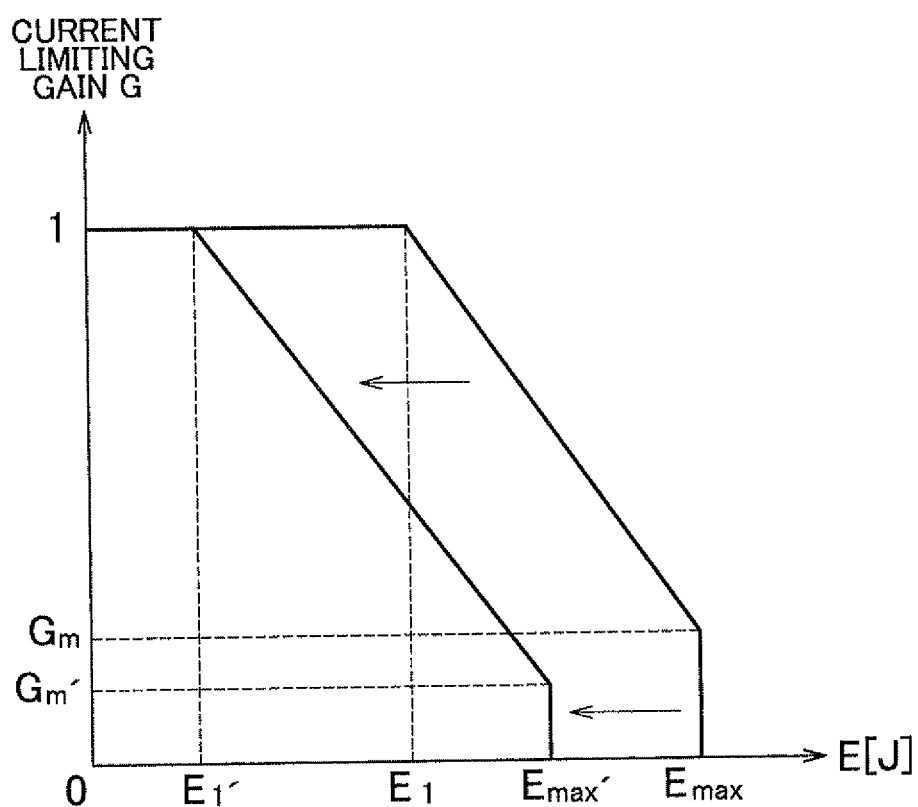
FIG. 5 is a graph illustrating how an intermediate value (intermediate point) and a maximum value of the EPS energy consumption shown in FIG. 3 are reduced as the power storage capacity of a storage battery changes or as the storage battery ages.

The graph in FIG. 5 illustrates how the intermediate value (intermediate point) E1 and the maximum value Emax of the EPS energy consumption shown in FIG. 3 are reduced as the power storage capacity of the storage battery changes or as the storage battery ages (refer to the arrows in FIG. 5), In FIG. 5, E1' represents the intermediate value (intermediate point)

E1 after the reduction, Emax' represents the maximum value of the EPS energy consumption after the reduction, and Gm' represents the current limiting gain corresponding to the reduced maximum value Emax' ($0 \leqq Gm' \leqq 1$). The invention has been described with reference to the example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

What is claimed is:

1. An electric power steering system, comprising:
    a unit that detects an idle-stop state of an engine;
    a steering operation assist motor that produces steering operation assist force;
    a drive circuit that drives the steering operation assist motor;
    a power source that powers the drive circuit;
    an energy consumption calculating unit that calculates or estimates an amount of energy that is consumed by the drive circuit from when the engine is placed in the idle-stop state;
    a current limiting unit that limits a command value of current to be supplied to the steering operation assist motor such that the current command value is smaller as the amount of energy consumed by the drive circuit is larger, the amount of energy consumed by the drive circuit being calculated or estimated by the energy consumption calculating unit; and
    a motor drive controlling unit that controls the drive circuit based on the current command value limited by the current limiting unit.

2. The electric power steering system according to claim 1, wherein the energy consumption calculating unit calculates or estimates the amount of energy consumed by the drive circuit, by integrating an amount of electric power consumed by the drive circuit.

3. The electric power steering system according to claim 2, wherein the current limiting unit sets a maximum value for the amount of energy consumed by the drive circuit, and makes the current command value substantially equal to zero when the amount of energy consumed by the drive circuit exceeds the maximum value.

4. The electric power steering system according to claim 3, wherein the maximum value of the amount of energy consumed by the drive circuit is set in accordance with a power storage capacity of the power source.

5. The electric power steering system according to claim 4, wherein a change in the power storage capacity of the power source due to a change in load on the power source and aging of the power source is estimated by measuring a voltage of the power source.

6. The electric power steering system according to claim 2, wherein the maximum value of the amount of energy consumed by the drive circuit is set in accordance with a power storage capacity of the power source.

7. The electric power steering system according to claim 6, wherein a change in the power storage capacity of the power source due to a change in load on the power source and aging of the power source is estimated by measuring a voltage of the power source.

8. The electric power steering system according to claim 1, wherein the current limiting unit sets a maximum value for the amount of energy consumed by the drive circuit, and makes the current command value substantially equal to zero when the amount of energy consumed by the drive circuit exceeds the maximum value.

9. The electric power steering system according to claim 1, wherein the maximum value of the amount of energy consumed by the drive circuit is set in accordance with a power storage capacity of the power source.

10. The electric power steering system according to claim 9, wherein a change in the power storage capacity of the power source due to a change in load on the power source and aging of the power source is estimated by measuring a voltage of the power source.

11. The electric power steering system according to claim 8, wherein the maximum value of the amount of energy consumed by the drive circuit is set in accordance with a power storage capacity of the power source.

12. The electric power steering system according to claim 11, wherein a change in the power storage capacity of the power source due to a change in load on the power source and aging of the power source is estimated by measuring a voltage of the power source.

* * * * *